Herbert Scheel
Inventor

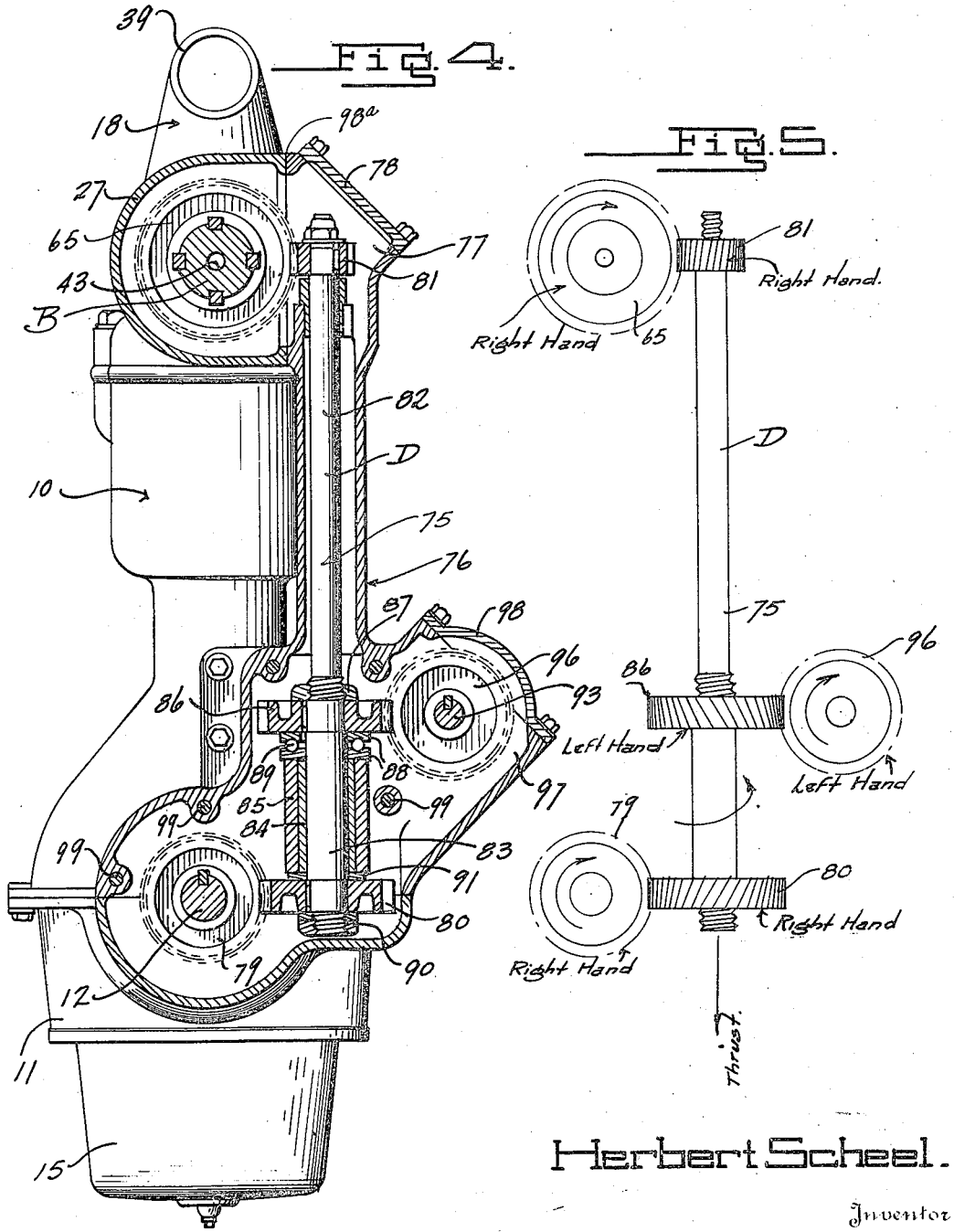

Sept. 9, 1924.

H. SCHEEL 1,508,073

LUBRICATING SYSTEM FOR ROTARY VALVE MOTORS

Filed Oct. 8, 1921 4 Sheets-Sheet 4

Herbert Scheel.

Patented Sept. 9, 1924.

1,508,073

UNITED STATES PATENT OFFICE.

HERBERT SCHEEL, OF ST. LOUIS, MISSOURI.

LUBRICATING SYSTEM FOR ROTARY-VALVE MOTORS.

Application filed October 8, 1921. Serial No. 506,446.

*To all whom it may concern:*

Be it known that I, HERBERT SCHEEL, a citizen of the United States, residing at St. Louis, in the State of Missouri, have invented certain new and useful Improvements in Lubricating Systems for Rotary-Valve Motors, of which the following is a specification.

This invention relates to a rotary valve controlled internal combustion engine.

The primary object of the invention is the provision of an improved rotary valve for use in internal combustion engines, designed from a practical and technical standpoint to overcome the impractical features heretofore involved in this type of valve.

Specifically, the invention includes the provision of a complete lubricating system for internal combustion engines embodying the improved rotary valve, and cooperating with the rotary valve to provide a proper lubrication therefor.

A further object of the invention is the provision of a rotary valve internal combustion engine, and a lubricating system of the above described character, in which the lubricating material is antomatically supplied to the bearing surfaces and seat of the rotary valve by reason of the peculiar structure of the valve itself.

Other objects will be apparent during the course of the following detailed description.

In the accompanying drawings, forming a part of this specification, and in which similar reference characters designate corresponding parts throughout the several views, Figure 1 is a vertical cross sectional view of an internal combustion engine, and showing the improved rotary valve mounted therein.

Figures 2, 3:
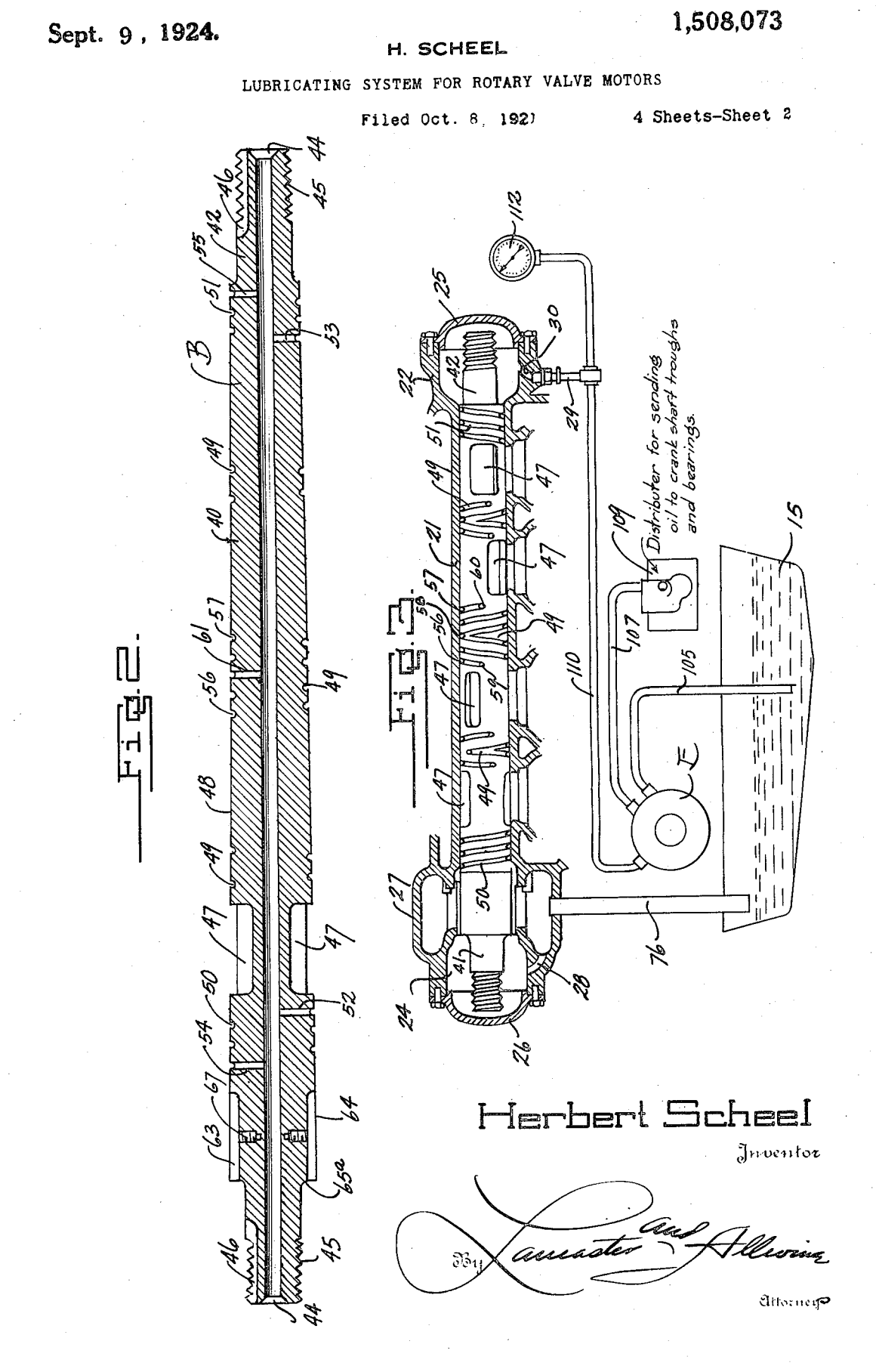

Figure 2 is a longitudinal cross sectional view taken through the rotary valve.

Figure 3 is a diagrammatic view illustrating the lubricating system as used in a rotary valve controlled motor.

Figure 4 is a front elevation, partly in section, and showing the means for driving the rotary valve from the crank shaft of the engine.

Figure 5 is a diagrammatic illustration of the drive mechanism employed in the internal combustion engine for valve rotation.

Figure 1:
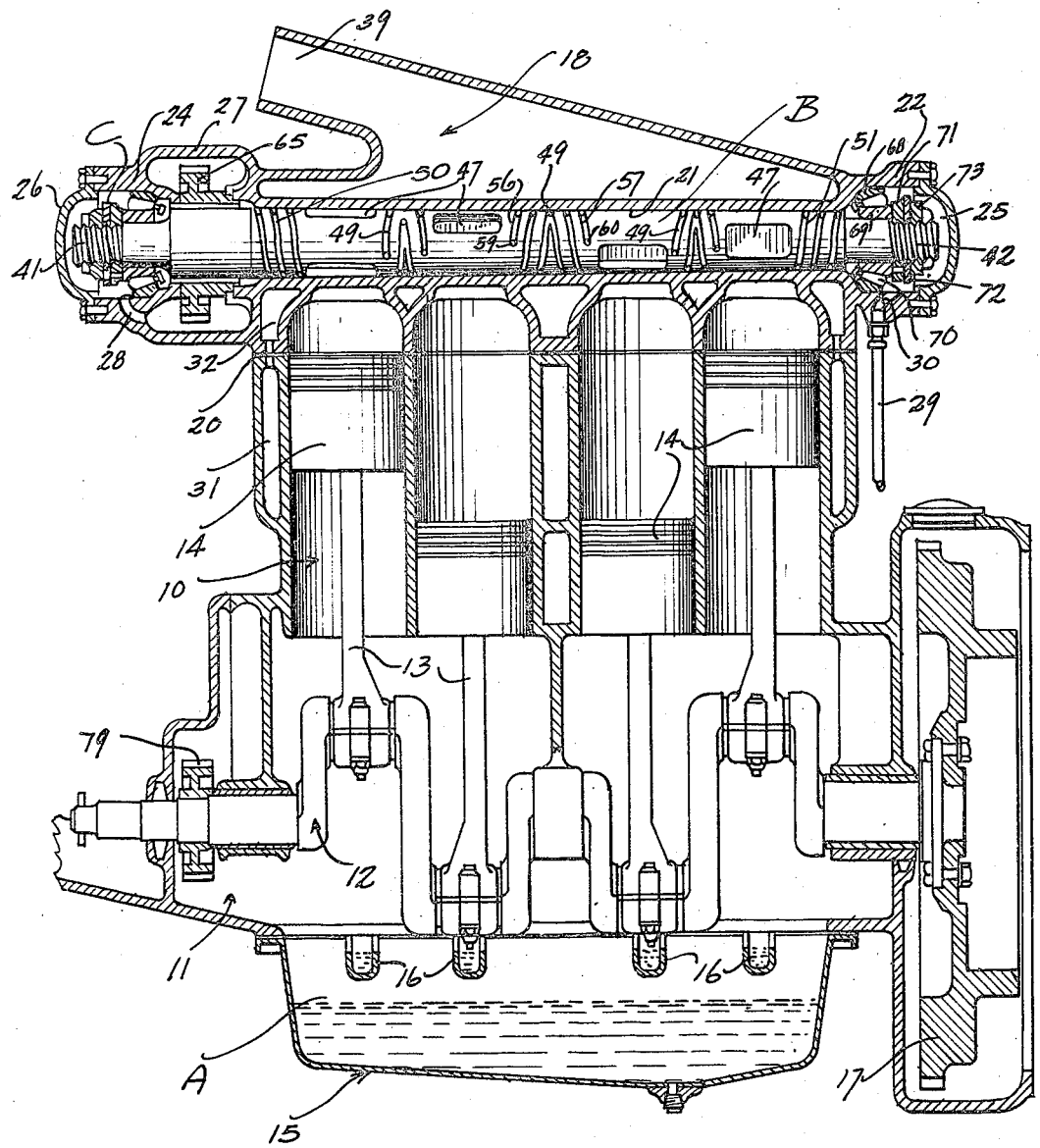
Figure 6:
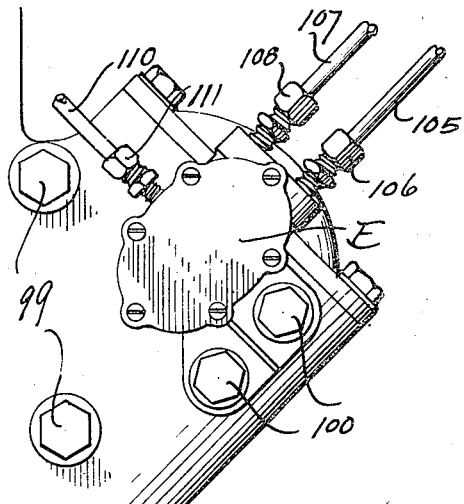
Figure 6 is a fragmentary front elevation of an oil pump as used in the lubricating system of the rotary valve motor.
Figure 7:
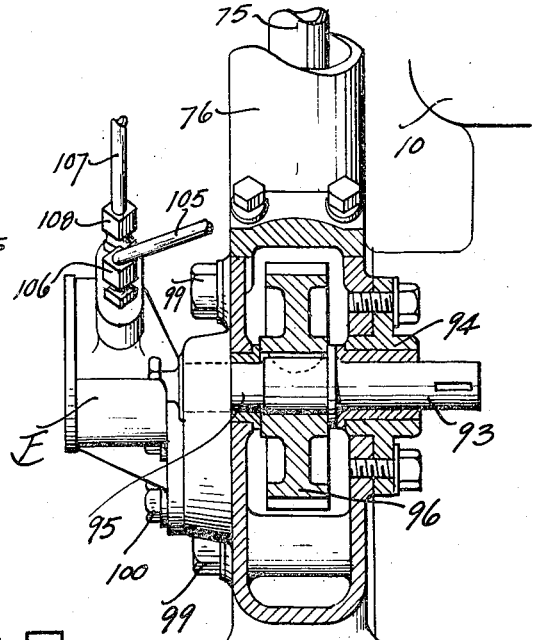
Figure 7 is a cross sectional view through a portion of the engine, and showing the mounting of the oil pump in side elevation and its driving connection.
Figure 8:
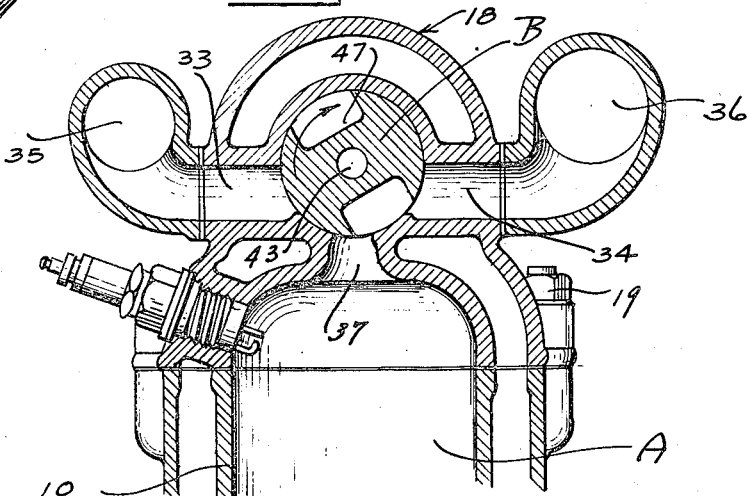
Figure 8 is a cross sectional view taken through the rotary valve and showing the manner in which the same is mounted for lubricating purposes in the cylinder head of an internal combustion engine.

In the drawings, wherein for the purposes of illustration is shown the preferred embodiment of my invention, the letter A designates the motor or internal combustion engine of any approved type, and having the improved rotary valve B mounted in the cylinder head thereof, and adjustably maintained therein by the adjustable anti-friction bearing devices C.

Drive means D is employed in the internal combustion engine for rotary movement of the valve B, said drive means D cooperating with the crank shaft of the internal combustion engine A. An oil pump E is provided upon the internal combustion engine A for control of the lubricating system in the internal combustion engine A, whereby the lubricant is fed onto the bearing surfaces of the rotary valve B.

The motor A may be of any approved type, and as herein shown comprises a cylinder casing 10 of the four cylinder type, cast en bloc. The crank case 11 is of ordinary internal combustion engine construction having the crank shaft 12 bearing therein, and supporting the connecting rods 13, upon which the pistons 14 are mounted for reciprocation within the cylinders of the casing 10. The motor A further embodies the oil pan 15, for receiving the lubricant of the internal combustion engine, the connecting rod troughs 16 being provided on the engine A as a part of the ordinary equipment. A fly wheel 17, is of course, mounted as in ordinary formation upon the rear of the internal combustion engine A, to effectively operate the crank shaft 12.

The cylinder head 18 is necessarily of special construction and is mounted upon the casing 10 as by bolts 19. A gasket 20 is provided, intermediate the cylinder casing 10 and the cylinder head 18 to provide a leak proof construction. The cylinder head 18 is provided with a conical or tapering seat 21 suspended therein, the large end of said cylinder head conical seat 21 being to the front of the internal combustion engine A and tapering in converging manner to the rear thereof. The seat 21 is, of course, provided for the rotary valve B, and the internal surface of said seat 21 is machined smooth and of accurate dimensions to insure a perfect working fit of the valve B therein. The head 18 further embodies a rear roller bearing housing 22, and a forward roller bearing housing 24. The roller bearing housings 22 and 24 are provided with detachable caps 25 and 26 respectively, whereby a person may have access to the interior of the valve seat 21, and for the purpose of adjusting the various anti-friction or roller bearings C. The casing 18 is provided with a gear housing 27 adjacent the forward bearing housing 24, and for the purpose of receiving a portion of the drive means D to be subsequently described. Communication between the bearing housing 24 and the housing 27 is had through a passageway 28. A lubricant feed pipe 29 is provided for detachable insertion in a passageway 30 in the rear roller bearing housing 22, and whereby lubricant can be pumped into the space within the housing 22, and in a manner to be subsequently set forth.

It is preferred that the motor A be of the water cooled type, the cylinder casing 10 having the water passageways 31 therein as in ordinary construction, and the cylinder head 18 being provided with the communicating passageways 32 therein, for co-operation with the passageways 31 of casing 10. Passageways 33 and 34 are provided in the cylinder head 18 leading into the conical seat 21, and for each cylinder of the casing 10; these passageways being provided respectively as conduits in the intake and exhaust manifolds 35 and 36, which are detachably positioned in any approved manner upon the sides of the cylinder head 18. Passageways 37 are provided in the cylinder head 18 which establish communication between the longitudinal seat 21 therein and the cylinders of the internal combustion engine A. The ordinary water jacket pipe 39 is provided upon the cylinder head 18 as an outlet for the water to the radiator (not shown) of the vehicle to which the internal combustion engine A is attached.

The rotary valve B is preferably formed of heat treated cast iron, permanently expanded to practically its maximum diameter within internal combustion engine ranges of temperature. The valve B includes the tapering or conical shaped body portion 40, having the reduced screw threaded stems 41 and 42 upon the larger and smaller ends respectively thereof. The valve B is provided with a uniform cross sectioned passageway 43, extending longitudinally and axially through the body portion 40 and reduced stems 41 and 42 thereof, the ends of the passageway 43 adjacent the outer faces of the stems 41 and 42 being outwardly flared as at 44 to permit free entrance and exit of lubricant, which is ordinarily adapted for disposal within the passageway 43, and in a manner to be subsequently set forth. The screw threads 45 are provided upon the stems 41 and 42 extending inwardly from the outer faces of said stems for substantially one-half the length of these stems, slots 46 being provided in each of the screw threaded portions 45, and for reception of a portion of the roller bearing means C. Two substantially rectangular control ports 47 are provided for each cylinder of the internal combustion engine A. The ports 47 are, of course, spaced upon the portion 40, inwardly of the bearing surface 48 of the valve B, and in such relation to each other that they conform to the spacing of the cylinders in the cylinder casing 10 of the internal combustion engine A. It is preferred that the ports 47 of an individual cylinder be located at exactly 180° with respect to each other in order to conform to the cycle of operation.

The bearing surface 48 of the body portion 40 of rotary valve B is provided with a double spiral groove construction 49 intermediate the ends of adjacent cylinder ports 47. Single spiral grooves 50 and 51 are provided upon the bearing surface 48 intermediate the ends of the ports 47 and the reduced shanks 41 and 42 respectively. The single spiral grooves 50 and 51 incline at a spiral away from the ends of the adjacent ports 47 and toward the reduced shanks 41 and 42 respectively, and are thus complete in themselves and on that portion of the bearing surface 48 offset from the ends of the ports 47. The extreme ends of the spiral grooves 50 and 51, which lie adjacent the ends of the ports 47, are provided with radial passageways 52 and 53 respectively, which communicate into the main lubricating passageway 43. These ducts 52 and 53 will hereinafter be termed entrance ducts, as the lubricant from the passageway 43 enters into the spiral grooves 50 and 51 through these ducts 52 and 53, in a manner to be subsequently set forth. The opposite ends of the grooves 50 and 51 are provided with exit ducts 54 and 55, which are of course, disposed nearest the reduced stems 41 and 42, since the spiral grooves 50 and 51 lead away from their adjacent ports 47 as hereinbefore set forth. It is preferred, that the spiral grooves 50 and 51 completely spiral for about three turns circumferentially of the bearing surface 48, and as clearly illustrated in Figure 1 of the drawings.

The double spiral groove constructions 49, which are provided inwardly of that portion of the bearing surface 48 which lies intermediate the ends of adjacent cylinder ports 47, are so constructed as to provide spiral grooves 56 and 57, which spiral away from their adjacent ports 47, and are consequently spiralled in converging directions toward each other, so that they terminate at a common juncture point 58. The ends of the spiral grooves 56 and 57 adjacent the ends of their respective ports 47 are provided with entrance ducts 59 and 60 respectively. From these ducts 59 and 60, the spiral grooves 56 and 57 lead away from their adjacent ports 47 to the common juncture point 58, wherein is formed the raidal duct 61 communicating into the lubricating passageway 43, and which is an exit duct. The rotary valve B, of course, can be so constructed, that the ports 47 thereon are formed to take care of any number of cylinders in an internal combustion engine. The portions of the bearing surfaces 48 intermediate the ports in said valve which are provided for adjacent cylinders are each provided with the double spiral groove constructions 49 above described. The individual spiral grooves 56 and 57 may, of course, be inclined in spiral fashion, to provide a predetermined number of convolutions circumferentially of the surface 48. Suitable key slots 63 are provided on a portion 64 of the rotary valve B and adjacent the reduced stem 41, said slots 63 leading inwardly from the shoulder 65ª as provided by said reduced stem 41, and for the reception of suitable keys to maintain a helical gear 65 of the drive means D to be subsequently described. Suitable screw threaded openings 67 may be provided radially in the valve B tapped in the bottom of the slots 63, and for receiving screws (not shown) to hold the keys of gear 65.

The anti-friction bearing constructions C, may be of the exact type described in detail, in my copending application Serial No. 418,-564, filed Oct. 21, 1920. They each comprise the roller bearing cup 68 receiving therein the supporting body 69 for rotatably supporting the roller bearings 70 therebetween. An adjusting nut 71 is provided for engaging the screw threaded portions of the stems 41 and 42 of valve B, for binding engagement about the outer face of the support 69, to force the same against the roller bearings 70 and for accurately supporting the rotary valve B. A fine adjustment between the bearing surface 48 of the valve B and the internal seating surface of the seat 21 of cylinder head 18 is desired, and in order that the adjusting nut 71 may hold the anti-friction bearings C in a predetermined position, the lock washers 72 are provided for cooperation with the adjusting nuts 71, in a manner fully described in the co-pending application above mentioned. An auxiliary lock nut 73 is provided, as a part of each of the anti-friction devices C, and engages the screw threaded portion of stems 41 and 42, for maintaining an accurate seating adjustment of said rotary valve B. The anti-friction supporting devices C are of course, placed in both the rear bearing housing 22 and the forward bearing housing 24, parts thereof being accessibly located because of the detachable caps 25 and 26.

The drive means D, is of special construction, and is formed principally of a train of helical gears connecting the crank shaft 12, and the rotary valve B, by means of a vertical shaft 75, which is disposed at right angles to the axes of the rotary valve and crank shaft of the internal combustion engine A. The shaft 75 is mounted in a special casing 76, which is detachably connected to the cylinder casing 10 and cylinder head 18 of the internal combustion engine A. The upper portion of the casing 76 is enlarged as at 77, and provided with a detachable cover 78 thereon, for access to the driving connection of shaft 75 with the valve B. A pair of right hand cooperating helical gears 79 and 80 are mounted respectively upon the crank shaft 12, and the lower end of the connecting shaft 75 and keyed thereto. These cooperating gears 79 and 80, are of course axially disposed at right angles to each other as illustrated in Figures 4 and 5 of the drawings, and are preferably of the same size. The extreme upper end of the connecting shaft 75 is provided with a relatively small helical gear 81 adapted for cooperation with the helical gear 65, mounted, as above described, upon the forward end of the rotary valve B. The ratio of the cooperating helical gears 81 and 65 is such that the speed of the rotary valve B will be reduced with respect to the speed of the crank shaft 12, in a ratio of 1 to 4. The helical gears 65 and 81 are cooperating right hand gears. Consequently, the rotary valve B will be driven clockwise, and in the same direction as the movement of the crank shaft 12, as is diagrammatically indicated in Figure 13.

The vertical shaft 75 is divided into an upper reduced portion 82 and a lower enlarged portion 83. The lower portion 83 is journalled within a bearing sleeve 84 of soft metal, such as babbitt, and circumferentially supported by a sleeve 85, formed integral or rigid with the casing 76, and adapted for supporting the shaft 75 in proper alignment. The upper end of the enlarged portion 83 is provided with a left hand helical gear 86, which is clamped thereon by an adjusting screw 87 engaging screw threads at the point of juncture of the portions 82 and 83 of shaft 75. Suitable ball bearing runways 88 are provided intermediate the lower part of the helical gear 86 and the top of the sleeve 85, supporting ball or anti-friction bearings 89 therebetween, and which bearings 89 receive the resultant of the thrusts upon the shaft 75. The lower helical gear 80 is of course, detachably mounted, as by a nut 90 engaging a screw threaded portion of shaft 75, a washer 91 being provided intermediate the top of helical gear 80 and the lower portion of the sleeve 85.

The generator and magneto drive shaft 93 is detachably mounted, as by means 94, in the casing 76, the same being provided with a reduced stem 95 projecting exteriorly thereof for mounting the oil pump E thereon. The shaft 93 is provided with a left hand helical gear 96, adapted for cooperation with the helical gear 86 to be driven thereby, and in a manner as illustrated in the diagrammatic view of Figure 5. The magneto shaft gear 96, is of course, enclosed in an offset 97 of the casing 76; a detachable cap 98 being provided for access to the shaft 93 and supporting mechanism of the vertical shaft 75. The casing 76 is bolted upwardly to the cylinder head 18, at 98ᵃ, and at the lower portion thereof, is bolted, as at 99 to the cylinder casing 10.

The oil pump E may be of any approved type, and the internal mechanism thereof being of course connected to the pump extension 95 of the shaft 93. Bolts 100 are employed in detachably mounting the pump E in position upon the casing or housing 76. In the arrangement of the lubrication system of the motor A, a pipe line 105, is detachably connected as at 106, to the pump E and which leads directly into the lubricating material in the sump or pan 15. A second pipe line 107 is detachably connected, as at 108 to the pump E and extends into a distributor mechanism 109 of any approved type, for conveying oil or lubrication to the troughs 16 for lubricating the bearings of the crank shaft connecting rods, as well as in ordinary formation. The distributor has individual lead pipes to the main bearing points of the crank shaft and internal combustion engine. A third oil feed line 110 is detachably connected, as at 111, into the pump mechanism E and which is provided for communication with the lubricating feed pipe 29, whereby oil or lubricant may be forced into the rear housing 22. A pressure gauge 112 is provided in communication with the feed lines 110 and 29 to determine the operating or working pressure of the pump E.

In operation, the oil or lubricant is drawn by operation of the pump mechanism E, through the pipe line 105, and directly from the sump or oil pan 15. The pump E, is of course driven, as above mentioned, by the shaft 93. The pressure within the oil pump E forces the same through the feed pipe 107 to the distributor, where the lubricant is sent, as above mentioned, to the connecting rod troughs and the crank shaft bearings. The oil or lubricant from the pump E is likewise forced into the conveying pipe 110, and the same is forced through the pipe 29, and into the enclosed rear roller bearing housing 22, through the passageway 30. As the level of the oil rises in the passageway 43 of the rotary valve B, and due to rotation of the valve, as above described, said lubricant or oil is centrifugally thrown into the end aperture 53 of spiral groove 51, and which is positioned adjacent an end of the port 47. The direction of rotation of the valve B, defines the aperture of the spiral groove 51, through which the same enters. As the rotary valve B turns clockwise, the duct 53 of course, will be the entrance duct for the lubricant into the spiral groove 51. As the valve rotates, the lubricant will seek its way circumferentially about the bearing surface and in the groove 51, being forced through the end duct 55 to return into the longitudinal chamber 43. Regarding a double spiral groove structure 49, and wherein are positioned the opposed spiral grooves 56 and 57, the direction of rotation of the valve B being clockwise, the lubricant enters the spiral grooves 56 and 57 through their respective end ducts 59 and 60, which are positioned adjacent the ends of the control ports 47 for individual cylinders. The lubricant will seek its way about the spiral grooves 56 and 57, and toward the common juncture point, wherein is positioned the exit duct 61 and for return of lubricant from the spiral grooves 56 and 57, into the chamber 43. The operation of the lubricant in the spiral groove 50 adjacent the enlarged end of the rotary valve B, is altogether similar to the operation of lubricant in the spiral groove 51. In other words, the duct 52 adjacent an end of the control port 47, is the entrance duct, and the duct 54 is provided for return of lubricant from the spiral groove 60 into the passageway 43. It can be seen that the lubricant is thus directed onto the bearing surface 48 of the rotary valve B adjacent the ends of the control ports 47, and led away from the control ports 47 to be returned to the passageway 43. This system of lubricating the rotary valve B, is of course, chiefly advantageous in the evenly lubricated bearing surface provided intermediate the various cylinders of the internal combustion engine, and whereby the lubricant is directed away from the control ports, thus preventing oil and other matter from entering the control ports 47, which might result in loss of compression. In fact, the chief disadvantage of rotary valves, is the difficulty experienced in providing a good compression within an engine cylinder, due to the fact that considerable clearance must be provided between the bearing surface of the rotary valve and the interior seating surface in the cylinder head. The improved valve construction does away with this disadvantage to a maximum extent, due to the fact that the same is constructed of permanently expanded metal, and cannot appreciably expand due to over-heating by frictional action against its seat.

The lubricant, of course, flows continuously through the central passageway 43 and about the bearing surface 48 through the various spiral grooves therein, said lubricant being prevented from deviating from its path by said spiral grooves. The lubricant, as the same exits from the central passageway 43 of rotary valve B flows into the front bearing housing 24, where the same exits through the passageway 28 into the enlarged portion 27 of cylinder head 18, and flows downwardly through the timing gear housing 76. The housing 76, is of course, enclosed, however, being open to the sump or oil pan 15, whereby the returning lubricant flows over the various helical gears of the drive shaft 75, and returns to the sump or lubricating pan 15.

The rotary valve B, is of course, removable through the front anti-friction bearing housing 24, by detachment of the cap 26 therefrom, and without interfering with the drive gears, thus said valve B being capable of a permanent adjustment as herein described, by means of the adjustable means C.

Various changes in the shape, size and arrangement of parts, may be made to the form of the invention herein shown and described, without departing from the spirit of the invention, or the scope of the claims.

I claim:

1. In an internal combustion engine having cylinders and inlet and exhaust passageways, a rotary valve having intake and exhaust ports therein and a passageway extending longitudinally therethrough, adjustable anti-friction means supporting said rotary valve at the ends thereof within the engine, means providing an enclosed compartment at each end, of said rotary valve within which said anti-friction means are disposed, said compartment being in communication with said passageway of said valve, and means for directing lubricant through said valve passageway and said compartments over said anti-friction means.

2. In a lubricating system for internal combustion engines, the combination of an engine, a rotary valve having a passageway extending therethrough and provided with grooves in the bearing surface thereof, each of said grooves having inlet and outlet ports communicating with said passageway, and means for supplying a body of lubricant to the passageway of said valve for automatic flow into said grooves.

3. In a lubricant system for motors, the combination of a motor, a rotary valve for said motor having a longitudinal chamber extending therethrough, said valve having spiral grooves extending circumferentially about the bearing surfaces thereof, each of said grooves having inlet and outlet ducts communicating in said valve chamber, and means for supplying a body of lubrication to the chamber of said valve for automatic flow into said spiral grooves.

4. In a device of the class described, the combination with an internal combustion engine including cylinders and pistons, a rotary valve for said engine having a longitudinal passageway extending therethrough and provided with cylinder ports spaced and depressed therein, spiral grooves in the bearing surfaces of said rotary valve intermediate said cylinder ports, each of said spiral grooves having inlet and outlet ducts leading into the longitudinal passageway of said rotary valve, and oil pressure means maintaining a lubricant in the rotary valve longitudinal passageway, for feed into said spiral grooves in automatic manner during rotation thereof.

5. In a device of the class described, the combination with an internal combustion engine including cylinders, of a rotary valve having a lubricating passageway extending longitudinally therethrough and provided with control ports depressed inwardly of the bearing surfaces thereof, said valve having spiral grooves adjacent each end of the ports and leading away therefrom, each of said spiral grooves having ducts in both ends thereof leading into the lubricating passageway of said valve, and means for supplying lubricating material into the passageway of said valve.

6. In a lubricating system for motors, the combination with an internal combustion engine including cylinders and operating means therefor, a rotary valve having a lubricating passageway extending longitudinally therethrough and provided with control ports depressed inwardly of the bearing surface thereof, said valve having spiral grooves adjacent the ends of the ports and leading away therefrom, each of the spiral grooves having ducts in the ends thereof leading into the lubricating passageways of said valve, each of said spiral grooves being complete in itself and within the bearing surface of said valve offset from the ends of said ports, and oil directing means for feeding the same into the passageway of said valve whereby during rotation of said valve oil is sent into the ducts of the spiral grooves adjacent the valve ports and to return to the passageway of said valve through the ducts remote from said valve ports.

7. In a device of the class described, the combination with a motor including cylinders, pistons and operating means, of a rotary valve having control ports therein for a plurality of engine cylinders, spiral grooves adjacent each end of the control ports and in the bearing surfaces of said rotary valve, said spiral grooves leading away from their adjacent ports and the spiral grooves intermediate adjacent cylinder ports leading to a common juncture point, said valves being provided longitudinally with a passageway for continually flowing lubricant, and having ducts in the ends of each of said spiral grooves for the entrance and exit of lubricant into the passageway of said valve, and means for supplying lubricant to the passageway of said valve whereby said lubricant is centrifugally directed through the ducts for continuous flowing in the spiral grooves to lubricate the bearing surfaces of said rotary valve.

8. In an internal combustion engine having cylinders and inlet and exhaust passageways, a rotary valve having intake and exhaust ports therein and a passageway extending longitudinally therethrough, and provided with ducts extending from the longitudinally extending passageway to the outer surface thereof, adjustable anti-friction means supporting said rotary valve at the ends thereof within the engine, means providing an enclosed compartment at each end of said rotary valve in which said anti-friction means are disposed, said compartments being in communication with the passageway of said valve, and means for directing a continuous flow of lubricant through said valve passageway, through the ports to the outer surface of said valve and into said compartments over said anti-friction means.

HERBERT SCHEEL.